United States Patent Office 3,640,900
Patented Feb. 8, 1972

3,640,900
HEAT TREATED BISMUTH MOLYBDATE AND PHOSPHOMOLYBDATE-ON-TITANIA CATALYSTS
William McClellan, Kennett Square, Pa., and Alvin B. Stiles, Wilmington, Del., assignors to E. I. du Pont de Nemours and Company, Wilmington, Del.
No Drawing. Filed Mar. 6, 1969, Ser. No. 805,016
Int. Cl. B01j 11/82
U.S. Cl. 252—437       4 Claims

ABSTRACT OF THE DISCLOSURE

A bismuth molybdate- or bismuth phosphomolybdate-on-titania catalyst is made by mixing a titania sol with compounds to give an aqueous slurry which produces, after drying and calcining, bismuth oxide, molybdenum oxide and optionally, silicon oxide and phosphorus oxide, in the desired proportions. A preferred method of preparing the catalyst is to add, prior to drying, ammonium carbonate, or aqueous ammonia, to the slurry until the pH is in the range of 5-7.5. Subsequently, the catalyst is dried and calcined at temperatures above 600° but below 700° C. The resulting catalyst has the formula:

$$Bi_aP_bMo_{12}(Ti_{1-x}Si_x)_cO_d$$

where $a$ is equal to or greater than 4, $b$ is 0 to 2, $c$ is 6 to 80, $d$ is $1.5a+2.5b+36+2c$ and $x$ is 0 to 0.5.

The catalyst produced is useful in various oxidation reactions, e.g. methanol to formaldehyde.

BACKGROUND OF THE INVENTION

The invention relates to catalysts and more particularly to heat-treated bismuth molybdate- and bismuth phosphomolybdate-on-colloidal titania catalysts and methods for their preparation.

Bismuth molybdate and phosphomolybdate catalysts are known in the art. They have been used for the oxidation of methanol and hydrocarbons, oxidative dehydrogenation of olefins, and also for the oxidation of olefin-ammonia mixtures to unsaturated nitriles. In general, such catalytic oxidations have required added water to obtain good conversions and yields.

Bismuth molybdate and phosphomolybdate catalysts are often deposited on a support. In general, silica is disclosed in the art as the preferred support. There are teachings that other materials which are inert may be used as alternate or auxiliary supports. For example, in U.S. Pat. 3,186,955, it is disclosed that "A preferred support is silica. . . . Many other materials such as alundum, silicon carbide, alumina-silica, alumina, titania and other chemically inert materials may be employed as a support."

Bismuth molybdate and phosphomolybdate-on-silica catalysts may be prepared through use of silica sols, for example, see U.S. Pats. 3,248,340 and 2,904,580, though, more generally the supported catalysts are prepared by impregnation of preformed solid inert supports with aqueous solutions of the active catalyst components. Although there are other methods of preparing supported catalysts, to applicants' knowledge, there is no specific description in the art of the preparation of bismuth molybdate-on-colloidal titania catalysts by use of titania sols.

U.S. Pat. 3,415,886 discloses calcining colloidal silica supported bismuth molybdate and phosphomolybdate catalysts, of the type described in U.S. 3,248,340 and 2,904,-580, at 750-850° C. to obtain compositions with improved selectivity and directivity in vapor phase oxidations. Further, these treated catalysts that have been heated at 750-850° C. function, for vapor phase oxidations, at higher temperatures than is the case for the normally calcined product.

SUMMARY OF THE INVENTION

Catalytic compositions of improved selectivity and directivity for vapor phase oxidations having the formula $Bi_aP_bMo_{12}(Ti_{1-x}Si_x)_cO_d$, where $x=0$ to 0.5 and $a=\geq 4$, $b=0$ to 2, $c=6$ to 80, and $d=1.5a+2.5b+36+2c$, are obtained by mixing an aqueous titania sol and, optionally, an aqueous silica sol, with a composition containing bismuth oxide, molybdenum oxide, and, optionally, phosphorus oxide in said proportions, or a composition yielding such oxides. Optionally ammonium hydroxide or an ammonium carbonate is then added to the composition until the pH of the composite is in the range of 5.0 to 7.5. The composition is then dried and the resulting solid calcined at a temperature above 600° C. but below 700° C., preferably at 625–675° C.

The titania supported catalysts of the present invention show outstanding selectivity as catalysts in certain vapor phase oxidations, particularly in the oxidation of methanol to formaldehyde. This is surprising since titania obtained from titania sols is not an *inert* support but actually is an active catalyst by itself, causing destructive oxidative catalysts even after being heated to temperatures as high as 650–675° C. With bismuth molybdate supported on colloidal titania, there is possibly some interaction at 625–675° C. that results in the markedly changed catalytic properties, but the nature of the changes brought about by the heat treatment is not fully understood.

Thus colloidal titania (formed by drying titania sol) calcined either at a temperature of 450° C. or at temperatures as high as 675° C. is a destructive catalyst in the vapor phase oxidation of methanol and many other oxidizable organic compounds. Bismuth molybdate and phosphomolybdate supported on colloidal titania calcined at temperatures up to 600° C. are also destructive catalyst in some reactions with activity at quite low temperatures. Thus, it is especially surprising that catalysts of this invention, calcined at temperatures above 600° C. but below 700° C., preferably at 625–675° C., not only have good selectivity and directivity in vapor phase oxidations but are superior in these respects to unsupported or silica-supported bismuth molybdate or phosphomolybdate compositions.

In comparison with the catalysts of this invention, bismuth molybdate-on-colloidal titania catalysts that are calcined at temperatures above 700° C. require, in general, 75 to 150° C. higher temperatures for catalysis of vapor phase oxidations and give considerably lower conversions. Further, good conversions and yields are obtained with the catalysts of this invention in many catalytic oxidations without the need for added water.

DETAILED DESCRIPTION OF THE INVENTION

Bismuth molybdate or phosphomolybdate-on-titania compositions, prepared as described for the bismuth molybdate-on-silica "Control A" catalyst in U.S. Pat. 3,248,304 and for catalyst of Examples 1–8 of U.S. Pat. 2,904,580, except that titania sol is used in place of silica sol, can be used as intermediates in producing the catalysts of this invention. However, in addition to the essential, high temperature calcining step of the present invention, it s preferred to add ammonium carbonate, ammonium bicarbonate, or ammonium hydroxide, as described in copending application Ser. No. 707,909, filed Feb. 2, 1968, now U.S. Pat. 3,497,461, after mixing the components of the catalyst and prior to drying.

As in conventional processes, aqueous mixtures of slurries of the oxides of bismuth, molybdenum, and optionally but preferably, phosphorus, or compositions yielding such oxides, are suitable for use in the present invention. There is nothing critical about the source of the ingredients of the catalyst composition, and commercially available reactants can be employed. Oxides that serve as reactants are usually obtained in situ from acids or soluble salts of the elements. Generally, phosphoric acid, ammonium molybdate, and bismuth nitrate serve as convenient sources of phosphorus, molybdenum and bismuth, respectively.

Bismuth salts such as the nitrate, formate and the acetate can be used. With bismuth salts, even the nitrates, it is usually necessary to add an acid to avoid hydrolysis and precipitation during the mixing step. Thus, when bismuth nitrate is used, it is generally combined with nitric acid and water to make a bismuth nitrate solution.

Molybdic acid or molybdenum oxide, $MoO_3$, itself can be used. Ammonium molybdate, however, is a preferred source of the molybdenum component of the catalyst.

Though ortho-phosproric acid is generally used as the source of the phosphorus component of the catalyst, meta-phosphoric acid and pyro-phosphoric acid may be substituted therefor.

Generally, the proportions of bismuth and molybdenum components of the catalyst are not critical as long as the atomic ratio (Bi:Mo) is controlled so that it is 1:3 or above. The upper limit on the amount of bismuth is not critical; however, in the interest of economy and the lack of substantially improved catalytic effect when large amounts are used, generally an atomic ratio of bismuth to molybdenum (Bi:Mo) of about 3:1 is not exceeded.

The catalyst preferably contain phosphorus, present as an oxide or in some other chemically combined form. The phosphorus affects catalytic properties, i.e., it acts as a moderator (improves selectivity), but it has no appreciable effect on the physical properties of the catalyst. Catalytic compositions may include from 0 up to about 3% by weight phosphorus present in chemically combined form. The preferred range is 0.3–1.0% by weight of phosphorus.

The catalyst of this invention involves use of titania as a support, and the titania must be added as colloidal titan is, e.g., as aqueous titania sol. By "colloidal" is meant particles 1–100 millimicrons in diameter which colloidal particles may, however, be aggregated, e.g., after intermixing with the other ingredients, by the processes of this invention into particles of, e.g., —8 to +40-mesh size for use in catalytic reactors. The titania can be present in the final catalyst in any amount less than 50% and greater than 2.3% by weight, but it is preferred that the catalyst contain about 6 to 30% by weight of titania. A portion of the titania may be replaced by silica and the silica, in such cases, may be added as an aqueous silica sol. The preferred compositions have a $TiO_2:SiO_2$ mol ratio $\geq 1$. The catalytic composition has the following formula:

$$Bi_aP_bMo_{12}(Ti_{1-x}Si_x)_cO_d$$

where $x=0$ to 0.05 and $a$ is $\geq 4$, $b=0$ to 2, $c=6$ to 80, $d=1.5a+2.5b+36+2c$.

Many catalytically inert materials such as alundum, alumina, silicon carbide, and the like can be used as auxiliary support materials, but titania is an essential component of the catalysts of this invention.

As well as serving as a support, titania is an essential component in obtaining the improved catalytic results with the present catalyst. Though colloidal titania alone when obtained from the titania sols, even after it has been heated at 625–675° C., is a destructive oxidation catalyst, similarly heated bismuth molybdate and bismuth phosphomolybdate on colloidal titania are outstandingly selective catalysts. It is highly probable that the finely divided titania is actually bonded into the Bi/Mo oxide structure during the high temperature treatment which results in the novel catalytically active product of the present invention.

A preferred titania sol is prepared by the method described starting in the last paragraph on p. 80 of J. Barksdale, "Titanium" 2nd ed. (1966), The Ronald Press Co., N.Y., using amomnium hydroxide for the neutralization step and hydrochloric acid for peptization. This method usually gives titania with a surface area of about 150 to 400 m.²/g. and a particle size of 5 to 25 millimicrons. Colloidal titania can also be produced by certain high temperature hydrolyses of titanium halides.

In the preferred embodiment of the invention, the catalysts have the following compositional ranges.

| Elements: | Wt. percent |
|---|---|
| Bismuth | 11–70 |
| Molybdenum | 8–38 |
| Titanium | 1.4–30 |
| Silicon | 0–9 |
| Oxygen | 15–45 |
| Phosphorus | 0–3 |

In a preferred embodiment, ammonium carbonate, ammonium bicarbonate or ammonium hydroxide is added to the sol containing the slurry of oxides or to the compounds which produce the desired oxides, to obtain a pH within the range of 5–7.5. The ammonium carbonates or hydroxide can be added with mixing as aqueous solutions or as powders. During the addition or soon thereafter, at a pH of 5.5 or higher, gelation usually occurs, the exact rate depending inter alia upon the purity and the particle size of the titania in the original sol. If gelation does not occurs, it can be effected by heating the slurry. It is desirable to obtain a gel since a more uniform product is obtained on drying a gel than is the case with a slurry.

The gel obtained, after addition of ammonium carbonate, bicarbonate or hydroxide, is preferably dried prior to the calcination step described hereinafter. The composition to which the carbonates have been added will contain in excess of 0.1% chemically combined carbon dioxide. When this composition is subsequently heated to 250° C. and higher, most of the carbon dioxide will be expelled. However, the carbon dioxide which has at one time been present leaves a residual porosity which is thought to contribute to the greater activity and directivity of this preferred catalyst in some processes. The structure of the catalyst may also be similarly modified by the initial presence and then the decomposition of hydroxy groups when ammonium hydroxide is used rather than the carbonates. The drying can be accomplished by conventional means such as air-drying, spray-drying, extrusion-drying, oil bath-drying, and the like.

The catalyst, which preferably has been dried, is calcined in a suitable furnace usually at a temperature higher than 600° C. but below 700° C. The time the catalyst is heated is not critical; the time can range from 0.5–10 hours or more and, preferably is 2–3 hours. If desired, the catalyst can be calcined in two steps, the first being at the temperatures conventional in the art, 400–500° C., and the second at the higher temperature. After the heat treatment, the catalyst, if it is not in the desired physical form, can be crushed and screened. It is also possible to heat-treat in situ; thus, the dried catalyst may be placed in a reactor wherein a catalytic reaction is to be conducted and preheated therein to 625°–675° C. either deliberately or by heat of the catalytic reaction. The 625–675° C. temperature range is for calcining in air, if an inert atmosphere is used, the temperatures may vary somewhat.

In a further aspect, the catalytic activity of the bismuth phosphomolybdate-on-titania and bismuth molybdate-on-titania catalysts can be enhanced or promoted by adding to the catalyst, usually ultimately in the form of their oxides, various metals hereinafter referred to as promoters. The amount of promoter added is not critical and the quantity can range from 0.1–10% by weight of the catalyst.

The following promoters can be present as oxides, mixed oxides or their reaction products: manganese, boron, the alkaline earth metals, e.g., magnesium, calcium, strontium, and barium; the rare earth metals, the metals of Group VIII such as iron, cobalt, nickel, ruthenium, rhodium, palladium, osmium, iridium, and platinum; and the metals of Group V, i.e., vanadium, niobium, and tantalum. Some of these promoters under the conditions of operations may be reduced to their respective metals or inter-metallic components.

These promoters are usually applied by impregnation or surface coating of already formed bismuth molybdate or phosphomolybdate-on-titania catalysts. Thus, the metals can be added to the slurried catalyst as a salt or acid of the metal, e.g., as a compound which is thermally decomposable in situ to form the desired promoter. After the catalyst has been impregnated with such solutions, employed in concentrations adequate to provide the desired amount of material, the impregnated catalyst can be dried and calcined at any desired temperature.

The catalysts of the invention are very useful in the vapor phase catalytic oxidation of olefins to their oxygenated derivatives, such as the conversion of olefins to aldehydes and ketones, e.g., propylene to acrolein. The catalysts are particularly useful for reactions which are conducted above 150° C.; however, once they have been prepared they can be used in reactions which are conducted at temperatures lower than 150° C. In the art process of oxidizing propylene to acrolein, water is added to enhance conversion and yield. With catalysts of the present invention, high yields and conversions are obtained in the absence of added water.

Further, the catalysts of the invention are useful in the catalytic oxidative dehydrogenation of olefins to diolefins such as butylene to butadiene and tertiary amylenes to isoprene. The catalysts are also useful in ammoxidation reactions such as converting propylene, ammonia and oxygen to acrylonitrile. The catalysts can be used for hydrodesulfurization, reduction of $SO_2$ to S or $H_2S$ and for the oxidation of $SO_2$ to $SO_3$.

The catalysts of the invvention are particularly useful in the conversion of methanol to formaldehyde. The novel bismuth molybdate and phosphomolybdate-on-titania catalysts give exceptionally high conversion and selectivity in this oxidation.

The catalyst of the invention is particularly useful in a two-step process for the catalytic conversion of methanol to formaldehyde as set forth in Payne, U.S. Pat. 2,519,788. In this art process a mixture of methanol, air and steam is introduced into a converter containing a silver gauze catalyst. In the initial feed, the air to methanol weight ratio ranges from 0.5:1 to 2:1. In this converter the methanol is partially (65 to 80%) oxidized and dehydrogenated to formaldehyde. This reaction takes place between 300° and 850° C.

The reaction products from the first converter, which include unreacted methanol, formaldehyde, water vapor and by-products, are then cooled below 180° C. and introduced into a second converter. Prior to introduction, auxiliary air is added to the reaction products to provide additional oxygen. The second converter contains a metal oxide catalyst, e.g., molybdenum oxide, a metal phosphate catalyst promoted with molybdic oxide, or an iron molybdate catalyst. In this converter the unconverted methanol is oxidized to formaldehyde. This second converter operates at a temperature between 250° and 600° C., and the oxygen concentration is between 7 and 14 volume percent.

The just described process is considerably improved by using catalysts of the present invention in the second stage or converter in lieu of the art metal oxide catalyst.

Use of the catalyst of the present invention permits wider ranges of temperature, greater variation in methanol and oxygen concentration, and also permits the addition of methanol with the supplementary air. It is usually satisfactory to employ an amount of oxygen 15–150% greater than the theoretical amount needed to convert the methanol to water and formaldehyde.

The maximum amount of methanol that can be used without encountering runaway reaction in a process of the type described in U.S. Pat. 2,519,788 is at least 10% greater when the present catalyst is employed in the second converter. This additional methanol can be added with the auxiliary air introduced into the product stream from the first converter and the capacity of a given commercial unit can be increased by a minimum expenditure for new facilities.

The present catalyst has the additional valuable property of resistance to fusion and/or loss of catalytic activity under runaway reaction conditions. The infrequent, but almost certain runaway reaction encountered in the second stage converter with the commercial catalysts usually employe requires shutdown of the unit for laborious removal of fused catalyst. The present catalyst survives runaway reaction temperatures greater than 650° C. without loss of catalytic activity.

The following examples are offered to further illustrate the catalysts of this invention. All amounts are expressed in parts by weight unless otherwise indicated.

EXAMPLE I

To 250 parts of a titania sol containing 10.9% by weight of $TiO_2$ is added a solution of 42 parts of $Bi(NO_3)_3 \cdot 5H_2O$ dissolved in 21 parts of water containing 1.75 parts of 70% nitric acid. This mixture is stirred while adding a solution of 20.5 parts of $(NH_4)_6Mo_7O_{24} \cdot 4H_2O$ in 23 parts of water. To this slurry is then added 18 parts of ammonium carbonate, resulting in a pH of 6.1. The temperature of the resulting slurry is raised slowly until gelatin occurs (about 45° C.) The gel is dried in an oven at 110° C. for 20 hours and then calcined in a furnace at 450° C. for 24 hours.

After cooling, the product is crushed into particles, screened through an 8-mesh screen and caught on a 20-mesh screen. A portion of this product, heated at 675° C. for 3 hours, has the following analyses:

|  | Percent |
|---|---|
| Titanium | 22.11 |
| Molybdenum | 20.17 |
| Bismuth | 30.00 |
| Oxygen (by difference) | 27.78 |

These data calculate (based on molybdenum) to the following atomic ratio relationship:

$$Bi_{8.1}Mo_{12}Ti_{26.4}O_{100}$$

EXAMPLE II

A vertical quartz tube, ¾″ in diameter, containing 5 cc. of the 675° C. heat-treated catalyst of Example I, supported on a thin bed of quartz wool in the middle of the tube, is heated externally with a surrounding electrically heated furnace. A gas stream prepared by vaporizing 7.2 g./hr. (0.225 mole/hr.) of methanol into a gas stream heated to 100° C. and formed by mixing a stream of helium with a flow of 1000 cc./min. and of oxygen with a flow of 75 cc./min. is introduced into the furnace at a temperature, as recorded by a thermocouple touching the outside wall of the quartz tube at catalyst level, of 350° C. A thermocouple embedded in the catalyst bed records a top catalyst bed temperature of 475° C. The effluent gas is passed into a flask cooled to 0° C. and the residual gas stream is scrubbed with methanol and then analyzed for CO and $CO_2$. Analysis of reaction products shows 96% conversion of methanol with 91% yield of formaldehyde. No measurable formic acid is obtained; the other products are oxides of carbon.

In a control experiment for the above example, a portion of the catalyst of Example I calcined only at 450° C. is used as the catalyst, under flow conditions described above. A furnace temperature of only 220° C. results in a top reaction (catalyst bed) temperature of 540° C. and the production of no measurable formaldehyde. The methanol is completely converted to CO, $CO_2$, $H_2$ and water.

In other control experiments, a portion of the 450° C. calcined product of Ex. I is heat-treated at 600° C. for 3 hrs. and another portion is heat-treated at 800° C. for 3 hrs. With the catalyst calcined at 600° C., a furnace temperature of 210° C. results in a reaction temperature of 485° C. and only a low yield of formaldehyde. With the catalyst calcined at 800° C. under the conditions described above, a furnace temperature of 510 C. (reaction temperature of 600° C.) is required for 90% conversion of methanol. Although the yield of formaldehyde (based on methanol consumed) is 94%, the reaction temperatures required are too high for practical use of this latter catalyst as replacement for iron molybdate in secondary converters in a commercial methanol oxidation process.

EXAMPLE III

To 270 parts of a titania sol containing 13% by weight $TiO_2$ is added a solution of 84 parts of $Bi(NO_3)_3 \cdot 5H_2O$ dissolved in 43 parts of water containing 3.5 parts of 70% nitric acid. With stirring, a solution of 41 parts of $(NH_4)_6Mo_7O_{24} \cdot 4H_2O$ in 46 parts of water and then 1.5 parts of 85% phosphoric acid is added, and the resulting slurry is adjusted to a pH of 6.4 by the addition of 30 parts of ammonium carbonate. Stirring is continued until gelation occurs. The gel is dried in an oven at 110° C. and then calcined in a furnace at 450° C. for 20 hours. After cooling, the product is screened to 8–14 mesh size. Catalyst (10 ml.) prepared by heating the calcined product at 650° C. for 2 hours has the following analyses; Ti, 19.21%; Bi, 34.18%; Mo, 19.68%; P, 0.5%; O (by difference) 26.43%. These data correspond to a composition (based on $Mo_{12}$): $Bi_{9.2}P_{1.0}Mo_{12}Ti_{23.4}O_{98.4}$. The catalyst is tested as described in Ex. II. A furnace temperature of 250° C. results in a top reaction bed temperature of 440° C. Analysis of the reaction products shows essentially complete conversion of methanol and high yield of formaldehyde. Also, with the same catalyst heat-treated at 625° C., a furnace temperature of 220° C. results in a top temperature of 420° C. in the catalyst bed and a high yield of formaldehyde.

I a control experiment for the above example, under the same conditions as described above with 10 ml. of catalyst prepared by heating the calcined product at 600 C. for 2 hours, a furnace temperature of 200° C. results in a top temperature of 450° C. in the catalyst bed and a low yield of formaldehyde.

In another control experiment for the example above, bismuth molybdate or phosphomolybdate-on-titania catalyst heat-treated at 750–850° C. as described in U.S. Pat. 3,415,886, is tested as a catalyst under conditions described in Example II. There is essentially no reaction with a furnace temperature in the range of 200° C. to 250° C. It is necessary to increase the furnace temperature to 380° C. or higher to obtain good conversions of methanol with this catalyst.

In still another control experiment for the above example, ammonium carbonate is added to titania sol containing 13% $TiO_2$ until the pH reaches 6.8. The gel that forms is dried and screened to 8–14 mesh size. A portion of the granular product is heated at 450° C. for 20 hours and a portion of this material is further heated in a furnace at 650° C. for 3 hours. The 450° C. calcined colloidal titania is tested under conditions described above. There is essentially no reaction at a furnace temperature of 240° C. but at a furnace temperature of 275° C., the reaction temperature is 520° C. and there is >99% conversion of methanol to CO, $CO_2$, $H_2$ and $H_2O$. Essentially no formaldehyde is formed. The 650° C. calcined colloidal titania is tested under the same conditions and gives the exact same result.

EXAMPLE IV

A catalyst is prepared just as described in Example III except that 150 parts of a 12.5% by weight $TiO_2$ sol and 2.5 parts of 85% by weight of phosphoric acid solutions are used in place of the amounts of the respective components specified in Example III. The final calcined product is heated at 650° C. for 3 hours.

A side-stream reactor consisting of a stainless steel tube 1″ in diameter, which contains 15 cc. of this catalyst and which is immersed in a circulating salt bath as a heat exchange medium, is connected into the line between the primary (silver gauze catalyst) and secondary (iron molybdate catalyst) converters in a commercial methanol oxidation process. First stage reaction product consisting of 7.8% $O_2$, 7.2% methanol, 17% formaldehyde, 7.5% hydrogen, 0.6% CO, 1.5% $CO_2$, 10.6% water, and 47.8% nitrogen is passed into the side-stream reactor tube at a rate of 1500 cc./min. The heat exchange bath is controlled at a temperature of 335° C. Analysis of the reaction product shows essentially quantitative conversion (>99.8%) of methanol at 86.5% overall yield of formaldehyde.

In a control experiment for the above example, 15 cc. of commercial iron molybdate catalyst is tested under the same conditions. A conversion of >99.8% is obtained with a heat exchange bath temperature of 305° C. and the yield of formaldehyde is 80%.

In another control experiment, a catalyst is prepared just as described above using silica sol in place of titania sol. This catalyst is calcined at 450° C. and a portion of it is further heated at 650° C. for 3 hours. The 450° C. calcined bismuth phosphomolybdate-on-silica catalyst under the same conditions described above gives an 82% yield of formaldehyde with a heat exchange bath temperature of 300° C. The 650° C. treated bismuth phosphomolybdate-on-silica catalyst gives lower conversions of methanol at slightly higher selectivity.

EXAMPLE V

To a mixture of 144 parts of a titania sol containing 13% $TiO_2$ by weight and 21 parts of a silica sol containing 30% $SiO_2$ and 0.1% titratable $Na_2O$, both parts by weight, is added a solution of 84 parts of $Bi(NO_3)_3 \cdot 5H_2O$ dissolved in 43 parts of water containing 3.5 parts of 70% nitric acid. With stirring, a solution of 41 parts of $(NH_4)_6Mo_7O_{24} \cdot 4H_2O$ in 46 parts of water and then 1.5 parts of 85% phosphoric acid is added, and the resulting slurry is adjusted to a pH of 6.7 by the addition of 30 parts of ammonium carbonate. Stirring is continued until gelation occurs. The gel is dried in an oven at 110° C. and then calcined in a furnace at 450° C. for 24 hours. The product is screened to 8–14 mesh size and portions are heated at various temperatures and tested as catalyst as described in Examples I–III. Catalyst heat-treated at 625° C., 650° C., and 675° C. give good yields of formaldehyde at high conversions.

In control experiments for the above example, the catalysts heat-treated at temperatures of 600° C. or lower have poor selectivity under the same conditions. Catalysts heat-treated at 700° C. or higher have good selectivity but conversions are not high and the temperature range required for catalytic reaction is 100–150° C. higher than required for catalysts heat-treated at 625–675° C.

What is claimed is:

1. A bismuth molybdate-on-titania catalyst having the formula $$Bi_aP_bMo_{12}(Ti_{1-x}Si_x)_cO_d$$

where 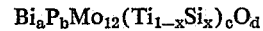 $a \leq 4$, $b$ is 0 to 2, $c$ is 6 to 80, $$d \text{ is } 1.5a + 2.5b + 36 + 2c$$

and $x$ is 0 to 0.5, said catalyst being formed by mixing an aqueous titania sol with a composition containing phosphorus oxide, bismuth oxide, silicon oxide, and molybdenum oxide in said proportions, drying the composition and calcining at a temperature above 600° C. but below 700° C.

2. The catalyst of claim 1 wherein the composition is calcined at 625° C. to 675° C.

3. The catalyst of claim 1 wherein prior to the drying step, ammonium carbonate, ammonium bicarbonate, or ammonium hydroxide is added to the aqueous composition until the pH of the composition is in the range of 5 to 7.5.

4. The catalyst of claim 3 wherein the composition is calcined at 625° C. to 675° C.

References Cited

UNITED STATES PATENTS

| | | | |
|---|---|---|---|
| 3,186,955 | 6/1965 | Callahan et al. | 252—437 X |
| 3,415,886 | 12/1968 | McClellan | 252—437 X |
| 3,497,461 | 2/1970 | McClellan et al. | 252—456 X |

PATRICK P. GARVIN, Primary Examiner

U.S. Cl. X.R.

252—456, 469; 260—603 R